July 3, 1956 WEN YUAN PAN ET AL 2,753,456

TUNABLE OSCILLATOR CIRCUITS

Filed Oct. 23, 1952

INVENTORS.
Wen Yuan Pan &
David J. Carlson

BY H. Weston

ATTORNEY.

United States Patent Office 2,753,456

Patented July 3, 1956

2,753,456

TUNABLE OSCILLATOR CIRCUITS

Wen Yuan Pan, Collingswood, and David J. Carlson, Haddon Heights, N. J., assignors to Radio Corporation of America, a corporation of Delaware Application October 23, 1952, Serial No. 316,528

11 Claims. (Cl. 250—36)

Figure 1:
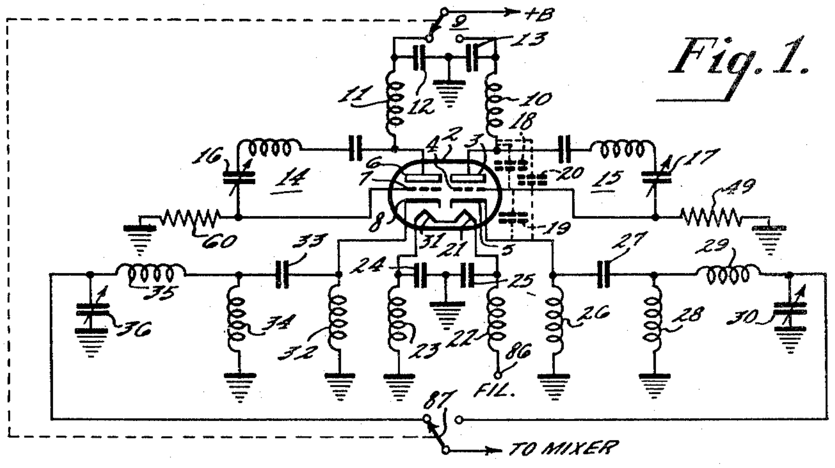

This invention relates to tunable oscillator circuits for signal receiving systems and the like, and in particular to oscillator circuits of the type referred to which are tunable over an extensive range of ultra-high frequencies.

An ultra-high frequency (U. H. F.) band from 470 to 890 megacycles (mc.) has been recently allocated for the transmission of television signals. This band will accommodate television channels 14 to 83. In receiving signals in this ultra-high frequency range it is obvious that the local oscillator of a television receiver must be tunable over a similar range of frequencies in order to provide the selected intermediate frequency signal. As is well known and understood, in order to tune a receiver to different selected signals, both the local oscillator and the radio frequency input circuits of the receiver must be tunable, and a constant frequency difference corresponding to the selected intermediate frequency should be maintained between the radio frequency input circuit and the local oscillator wave. Thus far commercial electron tubes capable of oscillating at such high frequencies in tunable circuits have not been extensively developed. If developed, their cost would probably be sufficiently high to make their use prohibitive in home instrument type radio signal receiving equipment. The need for a system of the type referred to using conventional electron tubes has therefore become important, particularly in the new U. H. F. television receiver field.

Since broadcasting in the U. H. F. band will initially be limited and confined to large population centers, it may be sufficient if receivers are tunable or made responsive to only one or two broadcast channels within the new U. H. F. band. For this purpose a U. H. F. converter having a local oscillator which may be tunable to but two of a variety of predetermined frequencies is adequate. It has been found to be impractical to accomplish this result by switching high impedance oscillator frequency determining circuits in oscillator systems primarily due to the shunt capacity variations of most selective contact switches at such ultra-high frequencies. Therefore, it is desirable that the selection of either of two channels in the U. H. F. television or similar band be accomplished using ordinary electron tubes and conventional variably tunable circuits and it is accordingly an object of the present invention to provide an improved oscillator circuit for use in an ultra-high frequency signal converter or receiving system which is tunable over the entire U. H. F. band selected, such for example as the present U. H. F. television band.

A further object of the present invention is to provide an improved oscillator circuit which is tunable and highly stable over substantially the entire U. H. F. television band and which permits the use of conventional oscillator tubes.

Another object of the present invention is to provide an improved local oscillator circuit for superheterodyne television receivers and signal converters which may be tuned to selected signals in a relatively wide U. H. F. frequency band, by means of simple tuned circuits.

Still another object of the present invention is to provide an improved oscillator circuit utilizing conventional electron tubes which may be adapted to generate selectively heterodyning signals for either of two different channels within the U. H. F. television band and without the use of complicated switching or control means.

These and further objects of the present invention are achieved by providing an improved oscillator circuit containing one or more electron tubes which may be tuned over a wide range of fundamental frequencies. In an embodiment of the invention containing a single electron tube means are provided for selectively connecting one of a plurality of tunable filter networks in circuit with the cathode path of the tube. The filter networks may be tuned to harmonic frequencies of the fundamental frequencies of the oscillator. In this embodiment of the invention advantage is taken of the fact that the shunt impedances of contact switches is less significant at low circuit impedance levels than at high impedance levels.

In further embodiments of the present invention involving a plurality of electron tubes, means are provided for selecting the frequency of operation through circuit means allowing selective energization of the tube anode circuits. In this latter embodiment selective tunable filter networks in the cathode circuits of the electron tubes provide an output path for oscillator frequencies representative of the harmonic frequencies of the selected fundamental frequencies of the oscillators. Thus the circuits embodying the features of the present invention may be readily made to function as a local oscillator in a heterodyne signal converting system which is selectively tunable over a wide range of U. H. F. spectrum.

Figure 2:
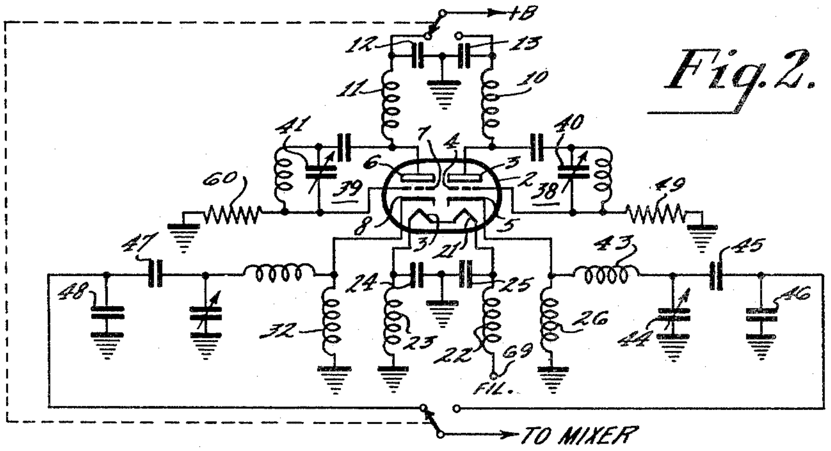
Figure 4:
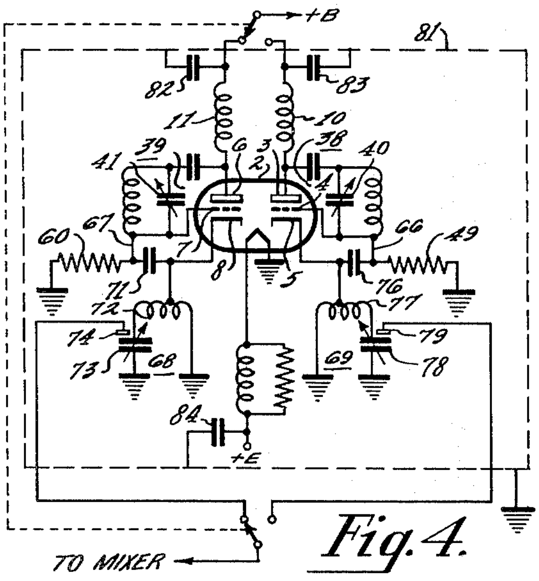
Figure 3:
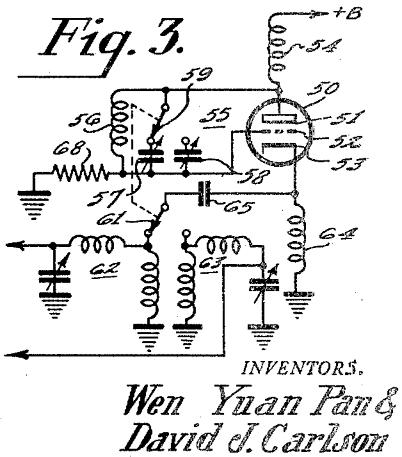

The novel features that are considered characteristic of of this invention are as set forth with particularly in the appended claims. The invention itself, however, both as to its organization and method of operation, as well as additional objects and advantages thereof, will best be understood from the following description when read in connection with the accompanying drawings in which:

Figure 1 is a schematic circuit diagram of a tunable oscillator circuit embodying the invention, and Figures 2, 3 and 4 are schematic circuit diagrams of modifications of the oscillator circuit of Figure 1, in accordance with the invention.

Referring to the drawing, wherein like elements are designated by like reference numerals throughout the several figures and particularly to Fig. 1, an electron oscillator tube 2, which may be of any suitable type such as a dual triode 6BQ7 or 12AT7 as shown by way of example, comprises an anode 3, a control grid 4, and a cathode 5 in one section and an anode 6, a control grid 7, and a cathode 8 in the other section. It should be understood that individual tubes may be used in place of the single tube illustrated, the latter being presently preferred.

Each section of the oscillator tube is selectively energized through switch means 9, comprising a simple two point switch in the present example, from a source of anode potential indicated by the positive lead +B. The right hand section as viewed in the drawing receives its energization or anode current through an inductor or choke coil 10 serially connected between the switch 9 and the anode 3. In a like manner, the left hand section as viewed in the drawing receives anode current through an inductor or choke coil 11 which is in series between the switch 9 and the anode 6. Two by-pass capacitors 12 and 13 are connected between the anode leads on the switch side of the choke coils and provide a by-pass to ground for unwanted radio frequencies that may not be stopped by the impedance of the choke coils which serve to isolate the anodes from the power supply at operating frequencies.

Each section of the oscillator tube is connected with a tank circuit indicated generally by the numerals 14 and 15 for the left hand section and the right hand section respectively. Each of the tank circuits contains a capacitor, an inductor and a variable capacitor which are serially connected between the anode and the control grid of each section. This arrangement provides a series tunable resonant circuit between the anodes and the grids of the tubes. The variable capacitor 16 for the left hand section and the variable capacitor 17 for the right hand section provide variable tuning means for the respective tank circuits which can therefore be tuned to any of a variety of fundamental frequencies. Feedback from the plates to the grids of the oscillator for maintaining oscillations in each section is provided by the interelectrodal capacitances of the tube. These interelectrodal capacitances are indicated by the dotted line element 18 for the plate-to-grid capacitance of the right hand section, the element 19 for the grid to cathode interelectrodal capacitance, and by the element 20 for the anode to cathode interelectrodal capacitance. The interelectrodal capacitances for the left hand section of the twin triode have not been shown for purposes of clarity but it should be understood that this tube section has similar interelectrodal capacitances. Grid bias is obtained from grid-leak resistors 49 and 60 for the right hand and left hand sections respectively. The cathodes 5 and 8 are heated by filaments or heaters 21 and 31 which are energized from a power supply lead terminal 86 designated "F1L," the opposite side of the filament circuit being connected to ground as shown. It will be noted that the supply lead F1L is connected through an inductor or choke coil 22 to the right hand filament 21 which is serially connected to the left hand filament 31. Left hand filament 31 is connected through a similar inductor or choke coil 23 to ground. By-pass capacitors 24 and 25 are connected between ground and the heaters 21 and 31. This circuit arrangement functions in a similar manner to the filter network in the anode circuit as above described to prevent oscillator signals from being conveyed to the filament or heater supply circuit. With the exception of the anode power supply switching arrangement of the circuit described thus far is somewhat conventional in nature.

In accordance with the present invention the oscillator output signal is taken from the cathodes of each section. To accomplish this an inductor 26 may be connected as shown in Fig. 1 from the cathode 5 to ground potential. Another inductor 28 is connected between the cathode 5 and ground potential through a capacitor 27. This latter inductor is in turn connected with the input inductor 29 of an L filter section including capacitor 30. The L filter section comprising elements 29 and 30 completes a form of cathode output circuit for the right hand tube section of the envelope 2.

In a similar manner the left hand section of twin triode 2 has an output circuit connected from its cathode 8. The output circuit for the left hand section comprises inductor 32, a capacitor 33, a second inductor 34, a third inductor 35, and variable capacitance 36, connected in a manner similar to the output circuit for the right hand tube section.

To connect the desired conducting output circuit to some form of heterodyne mixer, or other utilization means a switch member 87 is provided which is preferably gang connected as shown in Fig. 1 to the switch 9, which as previously explained connects the +B voltage in circuit with the desired plate electrode. In this manner, the operator in a single operation may energize the selected oscillator section and connect its output circuit to the mixer input lead. It should be understood that the switching means may take any of a number of well known forms to accomplish the result achieved in the arrangement illustrated.

The circuit illustrated in Figure 1 may be considered to operate substantially as follows: The individual triode sections of the tube 2 are energized one at a time by a source of direct current voltage (+B). This is accomplished by switch member 9 which may connect the (+B) voltage in circuit with the plate electrodes of either section. Thus if the right hand section containing anode 3, control grid 4, and cathode 5 is conducting, the left hand section will be non-conductive. Necessary feedback for oscillation from the anode 3 to the grid 4 of this section is provided by the interelectrodal capacitance of the tube. The resonant or fundamental frequency at which the right hand section oscillates may be continuously varied by means of variable capacitor 17. In a similar manner the left hand section has a tank circuit 14 whose resonant frequency may be varied by means of variable capacitor 16. Thus the fundamental or resonant frequency of each oscillator section may be continuously varied over an extensive range of frequencies. By merit of this it will be understood that each of the tank circuits for the individual triode sections may be effectively pre-set at a predetermined fixed frequency, thus providing a system which will provide signal output at one of two preselected frequencies.

The output signals for each of the triode sections, as previously explained, are taken from the cathodes. In the embodiment illustrated in Figure 1 and as described above a high pass filter network terminates each of the output circuits. By suitable well known filter design this filter network may be made of sufficiently high Q to suppress the fundamental frequency of the oscillator but pass with little attenuation a given harmonic frequency depending on the particular values of the circuit components used. The characteristics of the output filter may be suitably varied by means of variable capacitor 30 as oscillator operating frequency is changed. The cathode output circuit of the left hand section of tube 2 is substantially identical to that described above in connection with the right hand section of the tube. Thus this output circuit includes a high pass filter, and since its Q may be made quite high, it may conditionally reject the fundamental oscillator frequency of the left hand section while freely passing a given harmonic component of the fundamental. The output circuit for the left hand section may be also modified by means of variable capacitor 36.

As the operator or viewer selects the particular channel he wishes the switch 9 connects the anode of either one or the other of the triode sections to the +B source of energizing voltage. The selected oscillator section will thus begin to conduct. At the same time the switch 87 connects the cathode output circuit of the conducting oscillator section to a suitable mixer, or other utilization means.

It has been found that in the case of heterodyne mixer excitation if an output circuit is used that will pass equally the fundamental frequency as well as its second and third harmonics the excitation of the mixer will be primarily dependent on the fundamental component. The results because the fundamental frequency component is considerably stronger than the second harmonic component which is, in turn, stronger than the third harmonic component. Under these conditions, without the provision of the selective output circuit in accordance with the present invention, the mixer conversion efficiency would be rather low. By providing a high Q output circuit which is tuned to either the second or third harmonic component of the fundamental frequency, the fundamental frequency will be rejected and the mixer's excitation will depend primarily upon the desired harmonic which is injected thereinto.

Another embodiment of the present invention is illustrated in Figure 2. In this embodiment a twin triode tube of the same type used in the embodiment illustrated in Figure 1 has a right hand tank circuit 38 which is parallel resonant and tunable over a wide range of oscillator frequencies by means of capacitor 40. The left hand section has a similar tank circuit 39 which is also tunable by means of parallel variable capacitor 41. The oscillator as illustrated in Figure 2 operates in essentially the same means of a parallel variable capacitor 41. The oscillator in the manner of tuning the tank circuit to the particular fundamental frequency desired.

As in the operation of the oscillator circuit illustrated in Figure 1, the oscillator illustrated in Figure 2 receives operating anode potentials from a direct current source of voltage indicated generally by +B. Thus the right hand section receives its voltage through inductor 10 which is connected with anode 3, and the left hand section receives its operating potential through inductor 11 which is connected with anode 6. Two series capacitors 12 and 13 are connected between the respective voltage leads for providing a by-pass to ground for undesired radio frequencies. Heating potentials for the filaments 21 and 31 of the cathodes 5 and 8 are received from a filament power source terminal 69 designated "F1L." Grid bias is obtained from gridleak resistors 49 and 60.

As in Figure 1, the oscillator output signal for the embodiment of the invention illustrated in Figure 2 is taken from the cathodes of each section. To accomplish this inductors 26 and 32 may be connected from the cathodes 5 and 8 respectively to ground potential. The output circuit for the right hand section includes an inductor 43 which is connected between the cathode 5 and one extremity of capacitor 44 whose other extremity is grounded. The combination of capacitor 44 and inductor 43 forms a series resonant circuit which may be tuned to a harmonic of the fundamental oscillator frequency. For some applications it may be desirable to use a mixer circuit which presents a high impedance to the harmonic tank circuit. Means, therefore, must be provided for obtaining impedance matching between the tank circuit and such a mixer circuit. In the embodiment of the invention illustrated in Figure 2, impedance matching is obtained by connecting two capacitors in series between the output terminal of the series resonant circuit and ground, and connecting the output lead to the junction point of the capacitors. Thus the cathode circuit of the right hand section of the oscillator contains capacitors 45 and 46 connected in series between ground potential and the junction point of inductor 43 and variable capacitor 44 which comprise the series resonant circuit. Capacitors 47 and 48 are connected in an identical fashion for the left hand section. In this manner any desirable impedance matching may be obtained between the harmonic tank circuit and a mixer presenting an injection impedance other than that presented by the tuned circuit itself.

The circuit illustrated in Fig. 3 shows still another embodiment of the present invention. In this embodiment the present invention takes advantage of the fact that the capacitive shunt impedance variations ordinarily exhibited by a rubbing contact type switch are not as significant at V. H. F. as U. H. F. for a given circuit impedance. Further the undesirable effects of capacitive shunt impedance variations in a given type switch involved in switching radio frequency circuits is less significant at low circuit impedance levels that at high impedance levels. Therefore, the present embodiment of the invention restricts high impedance switching to only those circuits handling V. H. F. signal energy while applying switching to U. H. F. circuits only when such circuits can be made to exhibit a low impedance. In Fig. 3 the single triode indicated generally by the numeral 50 has an anode 51, a control grid 52, and a cathode 53. A source of direct current voltage provides energization potentials for the tube 50 and is connected through an inductor 54 to anode 51. The tube 50 has a high impedance tank circuit 55 connected between its anode 51 and control grid 52. The tank circuit 55 has an inductor 56 and two variable capacitors 57 and 58 which have capacitances of different value ranges and may be alternately switched into a parallel relationship with inductor 56 by means of switch contact 59.

In accordance with the above discussion of shunt capacity effects of switches handling low impedance radio frequency circuits the switch member 61 in the low impedance cathode output circuit may be gang connected to the switch member 59 in the parallel resonant tank circuit 55 of the oscillator. The switch member 61 will then place either filter network 62 or filter network 63 in the output circuit depending on the particular frequency which is being used. The networks 62 and 63 will be seen to be similar to the arrangements shown in Fig. 1. The oscillator circuit containing the single triode operates in a manner similar to each half section of the device illustrated in Figure 1 and can be used over a wide range of frequencies by virtue of the selective switching means as hereinbefore described.

Referring now to Figure 4, still another embodiment of the present invention is illustrated. The circuit illustrated in Figure 4 employs a twin-triode electron tube which may be of the same type as that illustrated in Figures 2 and 3. The tube has two anodes 3 and 6, two control grids 4 and 7, and two cathodes 5 and 8. The tank circuit 39 for the left hand section may be parallel resonant and may be made tunable over a considerable range of frequencies by variable capacitor 41. In a like manner tank circuit 38 of the right hand triode section may be tuned by means of variable capacitor 40. The anodes of each section are energized through inductors 10 and 11 which are serially connected to the anodes 6 and 3 respectively of each section. Grid bias is obtained from the biasing resistors 49 and 60 which are connected through short leads 66 and 67 to the grid plate tank circuits 4.

The resonant cathode output networks for each section of the oscillator are indicated generally by the numerals 68 and 69 for the left hand section and the right hand section respectively. Cathode 8 of the left hand section is connected with the grid leak resistor 60 through capacitor 71. The cathode 8 is also connected with a tap-on inductor 72 one end of which is grounded. The other end of the inductor 72 is connected through variable capacitor 73 to ground. The network 68 may be proportioned to be parallel resonant at a given harmonic frequency of the oscillator fundamental. The output from the resonant network 68 is taken through a small capacitor 74, one plate of which may be associated with the plate of capacitor 73. The capacitor 74 is made large enough to present a low impedance to the harmonic frequencies.

In a similar manner, the cathode 5 of the right hand sections of the twin-triode tube 2 is connected through capacitor 76 and grid-leak resistor 49 to ground. The cathode 5 is also connected to the inductor 77 forming part of the resonant network 69. One end of the inductor 77 is connected directly to ground and the other end is connected through a variable capacitor 78 to ground. Like resonant network 68, resonant network 69 is made parallel resonant at some oscillator harmonic frequency depending on the value of the circuit constants. To tune the circuit, capacitor 78 may be varied to cover a relatively wide range of frequencies. The output from the resonant network 69 is taken through a small blocking capacitor 79 which has a low impedance value at high frequencies and one plate of which may closely be associated with the plate of capacitor 78.

The tank circuits 38 and 39 in the embodiment of the invention illustrated in Figure 4 are capacitively coupled to the respective resonant output networks 69 and 68. To this end two capacitors 76 and 71 are provided in the cathode circuits 5 and 8 respectively. In some cases these capacitors may be given values in the order of 2 micro-microfarads. Thus they present a relatively low impedance to the harmonic frequencies of the fundamental oscillator frequency present in the tank circuit. Such energy will be readily coupled to the resonant harmonic networks 72 and 77.

In the operation of the embodiment of Figure 4 the triode sections of the tube illustrated are selectively energized one at a time by means of the source of +B voltage being connected to the appropriate tube anode by suitable switching means. The interelectrodal capacitance of the tube provides a feedback path between the plates and grids of each section for high frequency energy; thus each section will oscillate at a predetermined frequency depending on the tuning of its grid-anode tank circuit. A given harmonic frequency of the oscillator frequency will be coupled through the coupling condenser 76 in the case of the right hand section or through coupling condenser 71 for the left hand section to the harmonic resonant networks 69 and 68 respectively. If the capacitors 78 and 73 in each resonant network are properly valued the resonant networks 69 and 68 will pass a harmonic of the oscillator frequency and effectively reject the remaining undesired frequencies. The switching means will also be operative to connect the conducting resonant network output lead to a mixer input. Thus a signal which may be varied over an extensive range of high frequencies may be beat with the received signal at the mixer stage, and a constant I. F. beat signal will result. If the reception of only two U. H. F. channels is desired the tank circuits 38 and 39 may be set to resonate at predetermined fixed frequencies and in a like manner, the harmonic resonant networks 69 and 68 may be pretuned to resonate at given harmonics of the oscillator frequency.

There has thus been described an improved oscillator circuit which is suitable for producing energy in the newly allocated U. H. F. television band of frequencies and is readily adapted for use as a local oscillator in ultra-high to very high frequency radio signal converters. Since circuits embodying the present invention may employ conventional vacuum tubes and tuned circuits consisting of standard circuit elements, such circuits can be produced at a relatively low cost with presently well known manufacturing methods.

What is claimed is:

1. An oscillator circuit for operating over a wide range of the radio frequency spectrum comprising a first and a second electron tube each containing at least a cathode element, each of said electron tubes having a tank circuit tunable to a different predetermined fundamental frequency, a first switching means for selectively connecting a source of energizing potential to each of said electron tubes, an impedance element connected to each of said cathodes and to a point of fixed potential, separate resonant output circuits connected with each of said cathodes and tunable to a predetermined harmonic frequency of said fundamental frequency, and a second switching means simultaneously operable with said first switching means for connecting the resonant output circuit of the energized electron tube with a utilization circuit.

2. An oscillator circuit for operating over a wide range of the radio frequency spectrum comprising a first and a second electron tube, each containing an anode, a cathode and a control electrode, each of said electron tubes having a resonant circuit connected between its anode and control electrode, said resonant circuits being tunable to predetermined different fundamental frequencies, switching means for selectively connecting a source of energizing potential to each of said electron tubes, an impedance element connected to each of said cathodes and to a point of fixed potential, and frequency selective output circuits connected with each of said cathodes and tunable to pass predetermined harmonic frequencies of said fundamental frequencies.

3. An oscillator for operating over a range of the radio frequency spectrum comprising at least one electron discharge tube having an anode, a cathode, and a control electrode, a resonant circuit connected between said anode and said control electrode for determining the frequency of oscillator operation, means in said resonant circuit for tuning said circuit over a range of oscillator operating frequencies, a plurality of frequency selective cathode output circuits coupled with said discharge tube cathode, means for tuning each of said output circuits for response to a different harmonic frequency of said oscillator operating frequency, and switching means for connecting said output circuits one at a time with said discharge tube cathode.

4. An oscillator for operating over a range of the radio frequency spectrum comprising; a first and a second electron tube each containing an anode, a cathode and a control grid, each of said electron tubes having a resonant circuit connected between its anode and control grid, said resonant circuits being tunable to different predetermined fundamental frequencies, means for selectively energizing each of said electron tubes, a first and second inductor respectively connected between said first and second electron tube cathodes and a point of fixed potential, first and second intermediate output circuits including a serially connected inductor and capacitor, said output circuits being respectively connected in parallel with said first and second inductors, a first and a second terminating circuit connected from a point between said intermediate output circuits and a point of fixed potential.

5. An oscillator for operating over a wide range of the radio frequency spectrum comprising a first and a second electron tube, each containing an anode, a cathode and a control grid, each of said electron tubes having a separate resonant circuit connected between its anode and control grid, said resonant circuits being tuned to predetermined different fundamental oscillator operating frequencies, means for selectively energizing each of said electron tubes, a first and a second inductor connected respectively with each of said cathodes and a point of fixed potential, a first output circuit including a first capacitor and a third inductor connected from a point between the cathode of said first electron tube and said first inductor to a point of fixed potential, a fourth inductor and a first variable capacitor connected from a point between said first capacitor and said third inductor to a point of fixed potential, a second output circuit including a second capacitor and a fifth inductor connected from a point between the cathode of said second electron tube and said second inductor to a point of fixed potential, and a sixth inductor and a second variable capacitor connected from a point between said second capacitor and said fifth inductor to a point of fixed potential, said output circuits being tunable to pass a harmonic frequency of said fundamental frequency.

6. An oscillator for operating over a range of the radio frequency spectrum comprising two electron tubes, each having an anode, a cathode, and a control grid, a separate resonant circuit connected between each of said anodes and said control grids, capacitive means in said resonant circuits for tuning said circuits over a wide range of oscillator operating frequencies, a separate cathode output circuit connected with each of said tubes, means for tuning said output circuits to harmonic frequencies of said oscillator frequencies, and separate capacitive means coupling each of said resonant circuits to each of said output circuits.

7. An oscillator for operating over a range of the radio frequency spectrum comprising a first and a second electron tube each containing an anode, a cathode and a control electrode, each of said electron tubes having a tank circuit connected between its anode and control grid, said tank circuits being tunable over a range of frequencies falling within the very high frequency spectrum, a first switching means for selectively connecting a source of energizing potential to each of said electron tubes, frequency-selective passive networks connected with each of the cathodes of said electron tubes, means for tuning said networks over a range of frequencies falling within the ultra-high frequency spectrum, output connection means connected with said networks, a second switching means for selectively connecting the output connection means for the energized electron tube with a utilization circuit, and uni-control means for simultaneously operating said first and second switching means.

8. An oscillator for operating over a range of the radio frequency spectrum comprising an electron discharge tube having an anode, a cathode and a control electrode, an oscillator operating frequency determining high-impedance circuit connected between said anode and said control electrode, a first switching means for altering the resonant frequency of said high-impedance circuit, a plurality of low impedance networks tunable to different harmonic frequencies of said high-impedance circuit resonant frequencies, and a second switching means for selectively connecting said low impedance networks with said cathode, said first and second switching means being mechanically coupled for simultaneous switching action.

9. An oscillator for operating over a range of the radio frequency spectrum comprising a first and a second electron tube each containing at least a cathode element, each of said electron tubes having a tank circuit tunable to different fundamental oscillator operation frequencies, a first switching means for selectively energizing each of said electron tubes, separate impedance elements connected with each of said cathodes and to a point of fixed potential, separate resonant output circuits connected with each of said cathodes and tunable to a predetermined harmonic frequency of said oscillator operating frequencies, and a second switching means for selectively coupling said output circuits to a utilization circuit, said first and second switching means being mechanically-connected for simultaneous switching action.

10. An oscillator for operating over a range of the radio frequency spectrum comprising a first and a second electron tube each containing an anode, a cathode, and a control electrode, each of said electron tubes having a resonant tank circuit connected between its anode and control electrode, said tank circuits being tunable to predetermined different fundamental frequencies, means for selectively energizing each of said electron tubes, a first inductor connected with the cathode of said first electron tube and to a point of fixed potential, a second inductor connected with the cathode of said second electron tube and to a point of fixed potential, a first output circuit including a third inductor connected from a point between said first inductor and the cathode of said first electron tube, a first variable capacitor connected in series with said third inductor and a point of fixed potential, a second output circuit including a fourth inductor connected from a point between said second inductor and the cathode of said second electron tube, a second variable capacitor connected in series with said fourth inductor and a point of fixed potential, said variable capacitors being operative to tune said output circuits to predetermined harmonic frequencies of said fundamental frequencies, a first impedance matching network connected with a point intermediate said third inductor and said first variable capacitor and a second impedance matching network connected with a point intermediate said fourth inductor and said second variable capacitor.

11. A local oscillator for operating over a wide range of the U. H. F. spectrum comprising an electron tube, a first and a second oscillator section each containing an anode, a cathode and a control grid, each of said oscillator sections having a parallel resonant circuit connected between its anode and control grid, said resonant circuits being tuned to predetermined different fundamental frequencies, means for selectively energizing each of said oscillator sections, a filter network including an inductor and a first capacitor coupled to each of said resonant circuits, a series resistance and a second capacitor connected to each of said cathodes, electrical connections from points between said cathodes and said first capacitors to predetermined points on said inductors, and means for tuning said filter networks to predetermined harmonic frequencies of said fundamental frequencies.

References Cited in the file of this patent

UNITED STATES PATENTS

| | | |
|---|---|---|
| 2,146,091 | Peterson | Feb. 7, 1939 |
| 2,501,591 | Bach | Mar. 21, 1950 |
| 2,516,272 | Thompson | July 25, 1950 |
| 2,578,335 | Baylor | Dec. 11, 1951 |
| 2,645,718 | Keizer | July 14, 1953 |